Sept. 15, 1970   J. F. HINRICHS   3,529,122
ELECTRON BEAM WELDING OF RIMMED CARBON STEEL
Filed Jan. 6, 1967   3 Sheets-Sheet 1
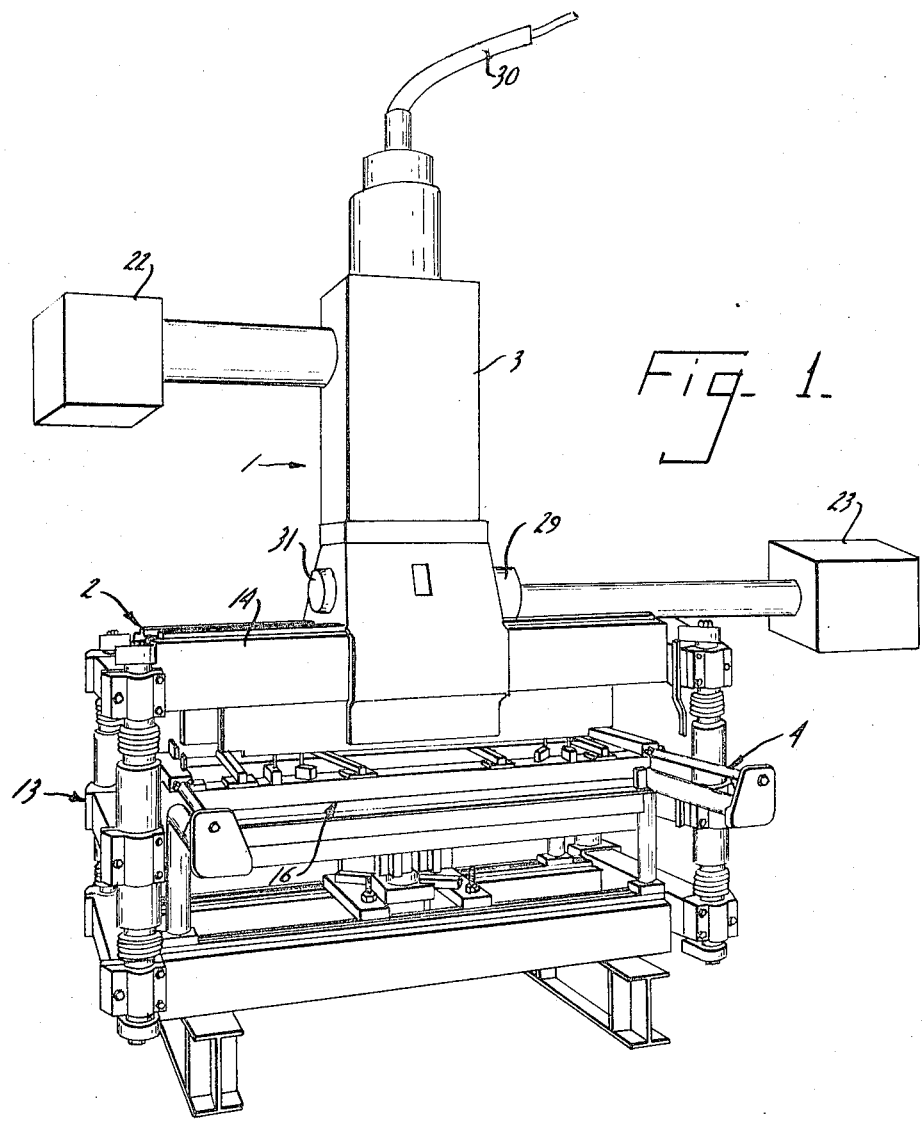
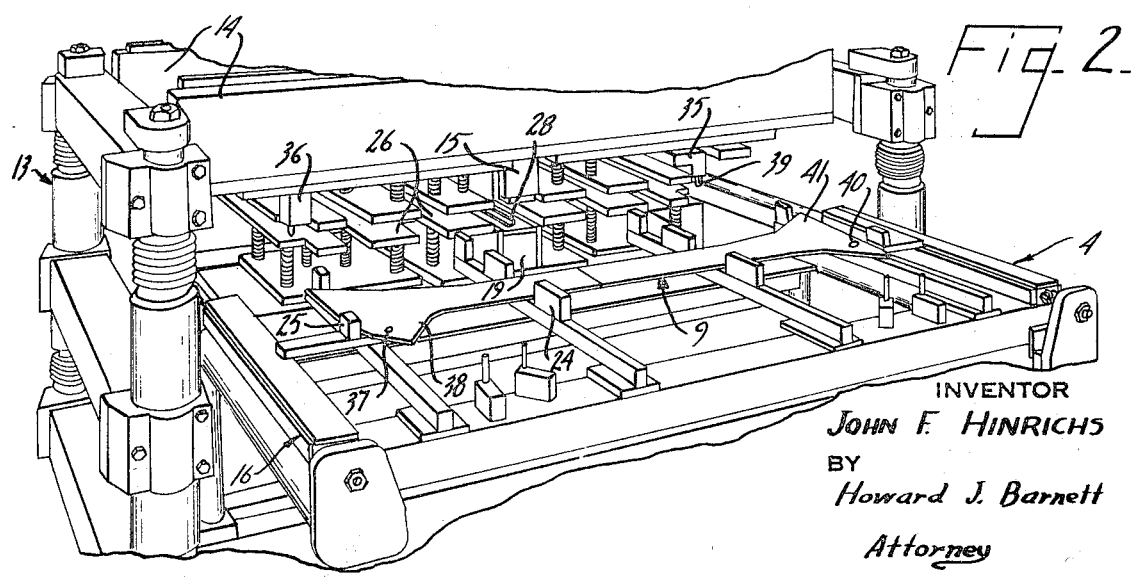
INVENTOR
JOHN F. HINRICHS
BY
Howard J. Barnett
Attorney

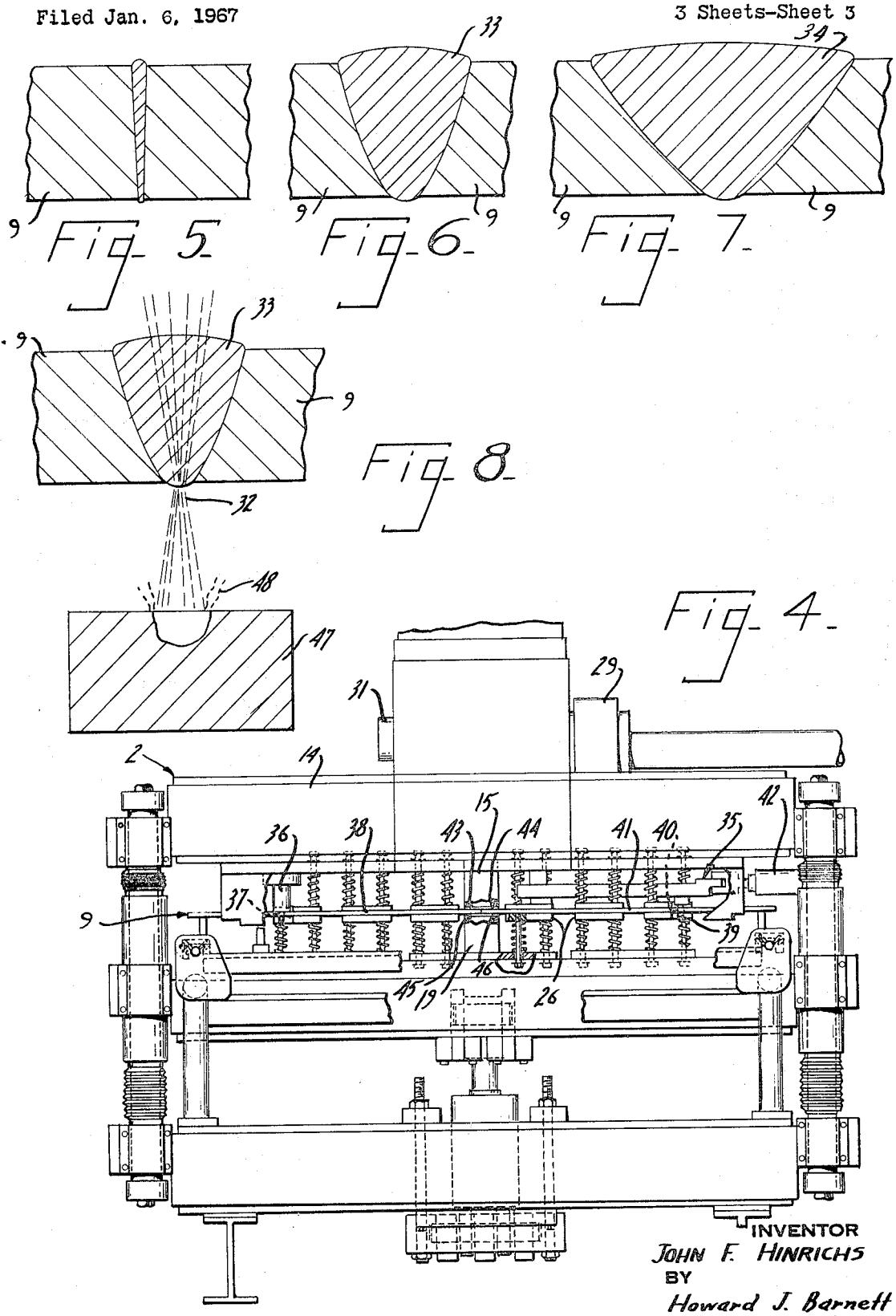

United States Patent Office 3,529,122
Patented Sept. 15, 1970

3,529,122
ELECTRON BEAM WELDING OF
RIMMED CARBON STEEL
John F. Hinrichs, Menomonee Falls, Wis., assignor to
A. O. Smith Corporation, Milwaukee, Wis., a corporation of New York
Filed Jan. 6, 1967, Ser. No. 607,826
Int. Cl. B23k 15/00
U.S. Cl. 219—121                 4 Claims

ABSTRACT OF THE DISCLOSURE

A method of welding low carbon steel using an electron beam, and more particularly, an assembly line method of electron beam welding structural blank components. Only the portion of the workpiece being welded is enclosed in the vacuum welding chamber, and the electron beam is intentionally defocused to obtain a low depth-to-width ratio in the weld section.

The electron beam gun and the workpiece both remain stationary during welding and the beam is deflected along the welding path on the workpiece.

The welding chamber comprises an upper and lower shell which moves apart to receive a portion of a workpiece therebetween. The shells are provided with vacuum-tight seals which clamp over only a portion of the workpiece, thereby facilitating a "pass-through" assembly line welding sequence because only a small volume chamber need be pumped down from atmospheric pressure to vacuum welding conditions, and the workpieces can travel in a continuous flow through the welding fixture.

BACKGROUND OF THE INVENTION

Prior to applicant's invention, the application of the electron beam to non-alloy, rimmed carbon steel had not been considered practical because the high depth-to-width ratio characteristic of electron beams employed in the conventional manner were not considered adaptable to applications where rimmed carbon steel is used. Large fit-up tolerances are also common in rimmed steel workpieces, and typical, narrow focused electron beams could not effectively bridge the larger gap distances. Typical examples of rimmed carbon steel uses are for passenger vehicle frame components, truck frame side rails, vehicle suspension members and similar stamped steel members where stock thicknesses range from .060" to .375". In addition, no mass production apparatus was available prior to applicant's invention. These earlier devices were manually opened and closed and were, therefore, not adapted to high production rates. In addition, the earlier devices enclosed large volumes which required pumpdown from atmospheric to vacuum welding pressures each time a workpiece was introduced to, or removed from, the vacuum welding chamber.

Applicant realized that if electron beam welding could be successfully applied to welding of automobile frames fabricated from rimmed carbon steel, there were several important advantages which would clearly and immediately offset the large initial capital investment. The electron beam welder requires no welding wire or shielding gas and is extremely fast, as well as automatic, so high production rates can be obtained without skilled operators, while retaining consistent, good-quality welds which are at least as strong and ductile as the parent stock, and can, therefore, be subjected to subsequent forming operations. The work can remain stationary while the wide defocused beam is deflected magnetically and wider seam tracking tolerances are possible. The process equipment is of a low maintenance type but has high production capabilities so that it is ideal for volume production applications.

In the past, a depth-to-width ratio in the order of 7 to 1 was considered the minimum desirable for a conventional electron beam weld section, as described in U.S. Pat. 2,987,610, issued to Karl H. Steigerwald on June 6, 1961. The maximum depth-to-width ratio under the Steigerwald method is about 20 to 1. As described in that patent, the welding occurs through "direct energy transfer" without relying on heat conduction. Applicant has discovered that this depth-to-width ratio is neither necessary nor desirable for typical automotive frame stock applications, nor is it necessary or desirable to use the "direct energy transfer" as described in the subject Steigerwald patent.

In addition, the electron beam requires an evacuated chamber to operate efficiently, and this has posed a most serious problem with regard to large workpieces, such as vehicle frame elements. The chamber sizes thought to be required were so large that the pumpdown time required would be excessive, and serious thought was not given to production line, vacuum chamber electron beam welding of automotive frame parts by others.

Traveling seals to isolate only a portion of a workpiece, such as a tubular member, have been proposed by E. W. Radtke in his U.S. Pats. 3,136,882 and 3,136,883. However, the system there proposed would not be practical for applicant's workpiece, and for high rate, automated production.

Attempts have also been made to use a procedure for welding mild steel parts in which the workpiece is at atmospheric pressure, but without notable success. In these attempts, the workpiece is placed in position at atmospheric pressure under an electron beam gun disposed in a chamber which has a small differentially pumped aperture aligned with the portion of the workpiece to be welded. This non-vacuum system has not proved effective for welding large and irregular-shaped workpieces by applicant's deflected beam method because short work-to-orifice distances are required when welding in the atmosphere and the beam deflection technique is difficult to apply because of the large deflection angles required and rapidly changing beam length. In addition, electrical energy is used less efficiently and atmospheric gases cause excessive porosity.

SUMMARY OF THE INVENTION

This invention is directed to a method of electron beam welding which is opposite to the teaching of Steigerwald, and in which a 1 to 1, or even 1 to 2, depth-to-width ratio is obtained by intentionally defocusing the electron beam to produce a much wider weld which utilizes heat conduction to fuse the parts together. Applicant's invention solves the vacuum enviroment problem by providing apparatus which does *not* enclose the complete workpiece, but encloses only the portion of the workpiece to be welded in a much smaller vacuum chamber isolated from the atmosphere. With applicant's apparatus, since the chamber is much smaller, a complete pumpdown time of three seconds from atmospheric pressure to vacuum welding conditions of 1 to 300 microns is possible.

The method of the invention is directed to welding rimmed carbon steel, and a deoxidizing, sacrificial backup chill may be disposed under the workpiece to provide deoxidizing action during welding to eliminate possible porosity in the completed weld due to gases escaping from the heated metal. An aluminum backup bar is presently in use, and it is believed that the electron beam vaporizes a sufficient amount of the aluminum during welding to unite with gases being released from the fusion zone to form solids and eliminate porosity. However, it is contemplated that other metals, such as copper or steel, can also be used effectively as backup bars.

BRIEF DESCRIPTION OF THE DRAWINGS

The drawings illustrate the presently preferred embodiment of the invention.

FIG. 1 is an overall perspective view showing the apparatus of the invention;

FIG. 2 is an enlarged perspective view with parts broken away showing the blank loading assembly;

FIG. 4 is a front elevational view of the apparatus with parts broken away and in section;

FIG. 5 is a transverse sectional view of a conventional high depth-to-width ratio electron beam weld;

FIG. 6 is a transverse section showing a weld made according to the invention and having a depth-to-width ratio of 1 to 1;

FIG. 7 is a transverse section showing a second weld made according to the invention and having a depth-to-width ratio in the order of 1 to 2; and FIG. 8 is a schematic transverse sectional view showing welding in progress and showing the relative disposition of the workpiece, the electron beam and the weld backup bar.

DESCRIPTION OF THE PREFERRED EMBODIMENT

Figure 3:
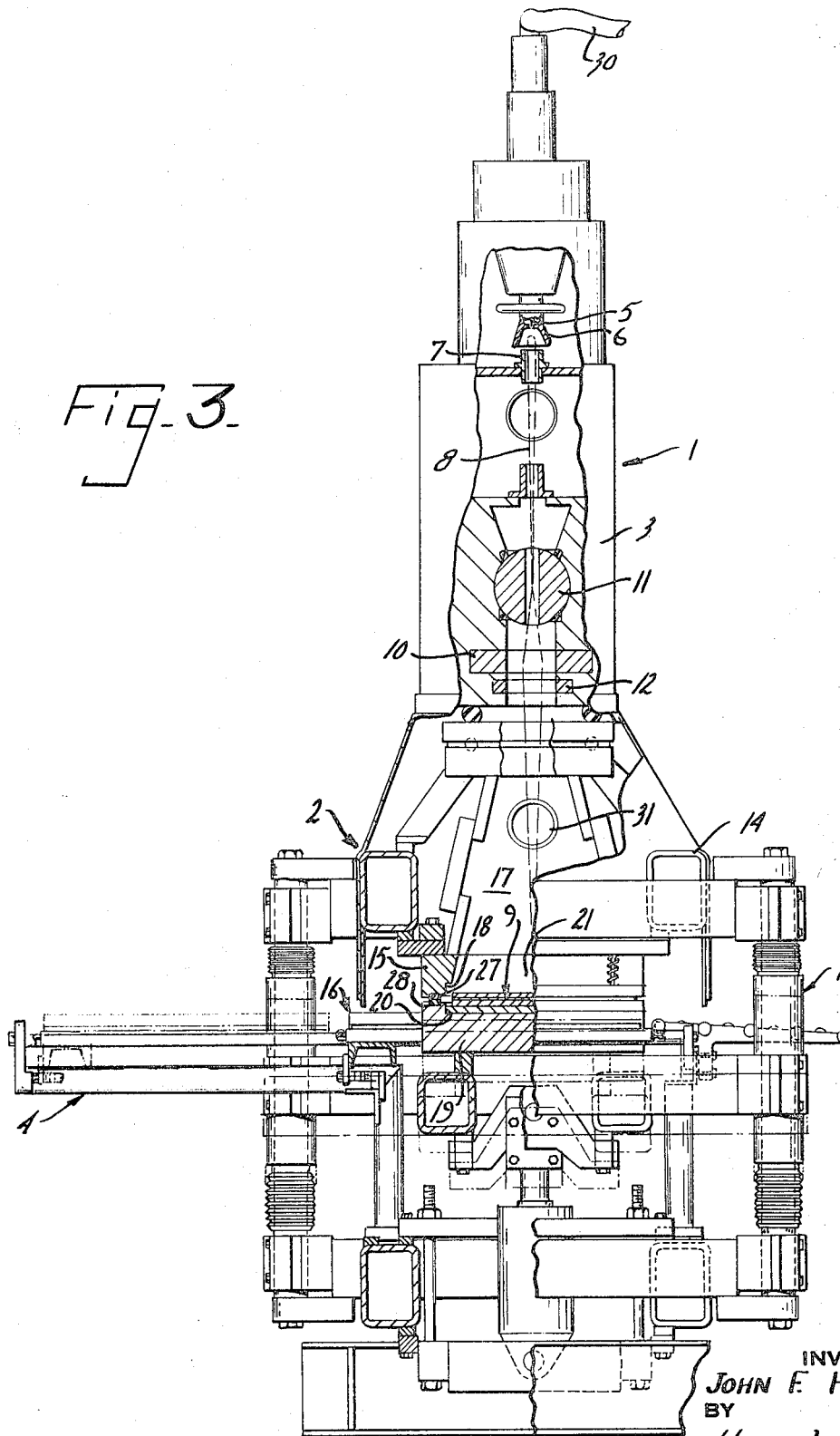
FIG. 3 is a side elevational view of the apparatus of FIG. 1, with parts broken away, and showing the electron beam welding apparatus diagrammatically.

As shown in the drawings, an electron beam gun assembly 1 is disposed on a support 2, and is provided with a vacuum enclosure 3. A workpiece loading assembly 4 is provided to position the workpiece in relation to the electron beam gun assembly 1. The electron beam gun assembly 1 is a similar to that shown in the Steigerwald Patent 2,987,610 but with the addition of the modified loading assembly 4 to adapt the electron gun assembly 1 for production-line welding.

As seen in FIG. 3, the typical assembly 1 includes an emitter cathode filament 5, a bias cup 6 for initially focusing the electron beam, and controlling beam current. A grounded anole 7 is provided to accelerate an electron beam 8. An accelerating potential of approximately 10,000 v. to 150,000 v. is provided during actual welding to direct the electron beam 8 down through the vacuum enclosure 3 and against a workpiece 9. Focusing of the beam 8 is accomplished by means of a magnetic coil 10 which is disposed between the workpiece 9 and the anode 7. A valve 11 is provided near the bottom of the vacuum enclosure 3. The valve 11 is adapted to remain closed at all times when actual welding is not underway to protect the cathode filament 5 from oxidation of the air. In addition, deflection of the beam 8 is accomplished by means of a deflection coil 12 which is provided to direct the beam 8 along the desired welding path of the workpiece 9. The electron beam gun assembly 1 is disposed on top of a welding fixture 13 which includes a frame 14, a welding chamber housing 15 and an automatic workpiece loader assembly 16. The welding chamber housing 15 defines a welding chamber 17 having a bottom opening 18 therein. A complementary lower housing 19 having a complementary opening 20 therein is provided to sealingly engage the housing 15, with the workpiece 9 disposed extending across the complementary openings 18 and 20. The housing 15 is connected to and extends downwardly from the vacuum enclosure 3 so that when the workpiece 9 is clamped in place for welding and the valve 11 is open, the welding chamber 17 and the vacuum enclosure 3, in cooperation with the workpiece 9 and the lower housing 19, form a single vacuum envelope 21 in which welding by means of the electron beam 8 may be carried out.

A vacuum pumping assembly 22 is provided for the vacuum enclosure 3 and a second, separate vacuum pumping assembly 23 is included to pump down the welding chamber 17 to the vacuum required for welding, which is in the range of 1 to 300 microns.

Prior to pumping down the welding chamber 17, it is necessary first to close and seal the workpiece 9 between the bottom opening 18 of the chamber housing 15 and the opening 20 of the lower housing 19. This is accomplished by means of a workpiece loading fixture 24 which is slidably mounted on the workpiece loader assembly 16. The fixture 24 includes workholders 25 which are adapted to grip the workpiece 9 and slide it in under the bottom opening of the welding chamber 17. A second set of workholders 26 then raise the workpiece vertically against the bottom opening 18 of the welding chamber 17 and urge the workpiece against a vacuum-tight seal 27. The lower housing 19 includes a complementary seal 28, and the lower housing 19 is raised against the workpiece 9 until the seals 27 and 28 engage each other and the opposite surfaces of the workpiece 9 to partially enclose the workpiece 9 in welding chamber 17.

At this point, a main pumpdown valve 29 connecting the welding chamber 17 to the vacuum pumping assembly 23 is opened. The chamber 17 is pumped down to about 100 microns in about three seconds and held at this condition. The vacuum pumping assembly 22 has been continuously operating to maintain the enclosure 3 at a pressure of about 1 micron. The valve 11 is then opened and the system is ready for welding, provided that the electron beam power source (not shown) connected through cable 30, magnetic coil power source (not shown) and beam deflection power source (not shown) have been energized. A normally closed vent chamber valve 31 is provided on the chamber 17 to bleed in air to break the vacuum when the chamber is to be reopened after welding. The valve 31 is closed at all other times.

As shown in FIG. 8, the desired depth-to-width ratio is obtained by pulling the beam focus cross-over point 32 down further in the direction towards the workpiece 9 by decreasing the focus coil current to lengthen the distance along the beam 8 from the center of the focus coil 10 to the cross-over point 32, at which the individual electron streams start to converge. Ideally, the beam cross-over point 32 should be at lower end of the stock thickness of the workpiece or beyond to obtain the most desirable depth-to-width ratio of 1 to 1, or even up to 1 to 2. Typical welds 33 and 34 produced by the method of the invention are seen in FIGS. 6 and 7 of the drawings.

The deflection coil 12 is energized during welding to deflect the defocused beam 8 along the desired welding path on the workpiece 9. If required, the deflection coil 12 can be energized in a manner to cause the beam 8 to traverse an oscillatory path across the workpiece 9. This method of beam travel is useful when the gap between the pieces to be joined exceeds normal tolerances.

For normal tolerances, a side loading mechanism 35 is provided to firmly butt the edges of the workpiece 9 together prior to welding. This mechanism includes a first pilot pin 36 adapted to be inserted in a pilot hole 37 of first half 38 of the workpiece 9. A laterally movable pilot pin 39 is provided, and is inserted in a pilot hole 40 in the second half 41 of the workpiece 9. The laterally movable pilot pin 39 is actuated by a hydraulic drive mechanism 42 after the first half 38 and the second half 41 of the workpiece 9 have been preassembled and loaded in the welding chamber 17. Blade clamps 43, 44, 45 and 46 are provided to insure that the edges to be welded are lined up. The clamps 43–46 are disposed within ¼" of the edges to be welded, and inside the welding chamber 17. Initially, the clamps 43–46 "soft" clamp the workpiece 9; then, after the pilot pin 39 has firmly butted the second half 41 of the workpiece 9 against the first half 38, the clamps 43–46 go into "hard" clamp condition preparatory to welding. Thus, it can be seen the workpiece halves 38 and 41 are maintained in the optimum position relative to each other to insure a full fusion electron beam weld 33.

As seen in FIG. 8, beam 8 hits an aluminum backup chill 47 to generate sufficient aluminum metal vapor 48 which is believed to deoxidize the heated mild steel of the workpiece 9 and tie up gas released in the weld 33, thereby preventing weld porosity.

After welding is completed, the valves 11 and 29 are closed, and the vent chamber valve 31 is opened. The chamber 17 is opened and the welded workpiece 9 is lowered, ejected and a new workpiece 9 is simultaneously loaded into the fixture and the cycle is repeated.

The typical steel composition of the workpiece 9 is as follows:

| | Percent by weight |
|---|---|
| C | .040–.054 |
| Mn | .32 |
| P, S, Si, Al and Ti | Trace |
| Fe | Balance |

In welding of this steel, an accelerating potential of 120,000 v. between the cathode 5 and the anode 7 was employed. The stock thickness of the workpiece 9 was .090″ and the beam current was 30 milliamps. The focus coil was set to obtain a defocused beam with sufficient power density to effect welding, and the distance from the workpiece 9 to the focus coil was about 27″, with a welding rate of about 75″ per minute. The average energy input using these conditions was 2,160 joules (watt/sec.) per inch of weld, or 36 watt minutes per inch of weld. Welding was in a vacuum of 1 micron and the average bead width was 3/32″ to provide approximately a 1 to 1 depth-to-width ratio.

The welds produced by this method are sound, and can be subsequently subjected to all forming operations which can be performed on the parent stock. The actual welding process is automatic and requires no special skill to operate once the equipment has been properly set up. The welding rate can be increased substantially by increasing the power output of the electron beam welding power source. Porosity, which was considered a serious problem in former attempts to weld mild steel, has been eliminated and the elimination of welding wire and shielding gas such as were required in other welding processes, largely compensates for the initial capital expenditure for the electron beam welding equipment and related vacuum pumping equipment.

The fact that the beam can be deflected along any desired, preprogrammed path, makes the process extremely versatile. Substantial metal savings are available in frame components where blanks can be nested better if made in half sizes.

Various modes of carrying out the invention are contemplated as being within the scope of the following claims particularly pointing out and distinctly claiming the subject matter which is regarded as the invention.

I claim:

1. The method of welding rimmed carbon steel with an electron beam welding assembly for producing a focusable beam of accelerated electrons, the steps comprising disposing a workpiece to be welded in proximity to the electron beam welding assembly, focusing the electron beam at a point beyond the workpiece so that the beam width at the intersection of the workpiece is wider than the width of the beam at said point beyond the workpiece, and welding said workpiece with said electron beam to produce a weld having a depth-to-width ratio substantially within the range between 1 to 1 and 1 to 2.

2. The method of claim 1, including the step of deflecting the electron beam along the portion of the workpiece being welded, while maintaining both the electron beam welding assembly and the workpiece stationary.

3. The method of claim 1, including the step of disposing the entire joint of the workpiece to be welded in a vacuum welding chamber with the parent metal portion of the workpiece extending therefrom, sealing the welding chamber, and evacuating said chamber to gauge pressure of 1 to 300 microns just prior to welding.

4. The method of claim 1, including the step of disposing the entire joint of the workpiece to be welded in a vacuum welding chamber with the parent metal portion of the workpiece extending therefrom, sealing the welding chamber, evacuating said chamber to a gauge pressure of 1 to 300 microns just prior to welding, removing said workpiece from said chamber, and simultaneously disposing a second workpiece to be welded in position for enclosure in said evacuated enclosure.

References Cited

UNITED STATES PATENTS

| | | |
|---|---|---|
| 3,033,974 | 5/1962 | Schleich et al. |
| 3,197,604 | 7/1965 | Turbyville et al. ___ 219—160 X |
| 3,264,004 | 8/1966 | Sciaky. |
| 3,378,670 | 4/1968 | Smith et al. |
| 3,401,249 | 9/1968 | Schleich et al. _____ 219—69 |
| 3,426,173 | 2/1969 | Steigerwald _____ 219—121 |
| 3,437,785 | 4/1969 | Sciaky _____ 219—121 |

OTHER REFERENCES

Bakish, White; Handbook of Electron Beam Welding; copyright 1964; John Wiley & Sons Inc. Page 147 relied on.

Hamilton Standard Electron Beam Welder, pp. 1–20, Industrial Products Dept., Windsor Locks, Conn., published December 1963.

Electron Beam Welding, by G. Burton et al., Welding Research Journal and Supplement, October 1959, pp. 401-S to 409-S.

JOSEPH V. TRUHE, Primary Examiner

R. E. O'NEILL, Assistant Examiner

U.S. Cl. X.R.

219—72, 160